US 7,184,182 B1

(12) United States Patent
Kuroda et al.

(10) Patent No.: US 7,184,182 B1
(45) Date of Patent: Feb. 27, 2007

(54) IMAGE RECORDING DEVICE

(75) Inventors: Yoshiharu Kuroda, Kyoto (JP); Takashi Yamagata, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1423 days.

(21) Appl. No.: 08/942,415

(22) Filed: Oct. 16, 1997

(30) Foreign Application Priority Data

Oct. 17, 1996 (JP) .................................. 8-274475

(51) Int. Cl.
H04N 1/04 (2006.01)

(52) U.S. Cl. ..................... 358/498; 358/474; 358/296

(58) Field of Classification Search ............... 358/296, 358/498, 474; 355/407, 408; 399/16, 23, 399/124, 363, 369; 271/8.1, 9.01, 9.05, 9.06, 271/9.09, 13
See application file for complete search history.

(56) References Cited

U.S. PATENT DOCUMENTS

| | | | |
|---|---|---|---|
| 5,025,326 A | | 6/1991 | Shimmyo |
| 5,057,937 A | | 10/1991 | Muramatsu et al. |
| 5,078,380 A | * | 1/1992 | Kitazawa .................... 271/9 |
| 5,412,490 A | * | 5/1995 | Kojima et al. ............. 358/498 |
| 5,661,567 A | | 8/1997 | Maeda et al. |
| 5,796,496 A | * | 8/1998 | Ono ........................... 358/498 |
| 5,822,075 A | * | 10/1998 | Kaneko et al. ............. 358/296 |

FOREIGN PATENT DOCUMENTS

| | | |
|---|---|---|
| EP | 0673147 A2 * | 3/1995 |
| EP | 0 673 147 A | 9/1995 |
| JP | 2-117559 A | 5/1990 |
| JP | 5-160939 | 6/1993 |
| JP | 6-3876 | 1/1994 |
| JP | 7-2412 | 1/1995 |
| WO | WO 91 07046 A | 6/1991 |

OTHER PUBLICATIONS

Japanese Office Action dated Jul. 8, 2003 for corresponding Japanese Patent Application No. 8-274475.

* cited by examiner

Primary Examiner—King Y. Poon
(74) Attorney, Agent, or Firm—Westerman, Hattori, Daniels & Adrian, LLP.

(57) ABSTRACT

An image recording device is equipped with both facsimile functions and copier functions. The image recording device is provided with an image scanning part that transports a document from a document sheet supply tray, scans an image on the document and discharges the document onto a document sheet outlet tray. The image recording device is also provided with a recording part that transports a recording sheet from a cassette unit, records an image on it and discharges the recording sheet on a recorded paper discharge tray. The recorded paper discharge tray is positioned at the uppermost part of the device. Below the recorded paper discharge tray, arranged are the document sheet supply tray, document sheet outlet tray, multi-purpose tray and the cassette unit. All the trays are confined within the width of the device. In other words, no trays project from the side of the device. The recorded paper in the recorded paper discharge tray is easily confirmed since the recorded paper discharge tray is at the top of the device.

13 Claims, 5 Drawing Sheets

IMAGE RECORDING DEVICE

BACKGROUND OF THE INVENTION

1. Technical Field

The present invention relates to an image recording device equipped with both facsimile functions and copier functions and provided with an image scanning part and recording part.

2. Background Art

An image recording device equipped with both facsimile functions and copier functions and provided with an image scanning part that advances a document and scans an image on the document and a recording part that advances a recording sheet and records an image on the recording sheet is publicly known. Trays such as a document sheet supply tray, document sheet outlet tray and recorded paper discharge tray are arranged on this kind of device. The document is fed from the document sheet supply tray to the image scanning part. After the scanning, the document is discharged onto the document sheet outlet tray. The recording sheet is fed to the recording part from a cassette unit. After the recording, the recorded sheet is discharged onto the recorded paper discharge tray. However, these trays project from the side of the device (generally one lateral side of the device) so that the ground space increases. For this reason, a type of device where these trays do not project from the side has been recently developed.

However, on even devices where the trays do not project from the side, the document transport part is positioned in the top part of the device for easier document sheet supply operations. As a result, the recorded paper discharge tray is often arranged in the inner part of the device. In particular, on a device equipped with facsimile functions, if the recorded paper discharge tray is arranged in the inner part of the device, the operator will often not realize that the recorded paper (paper on which is recorded the facsimile data received from a remote facsimile machine) has been exhausted due to the fact the he or she is very rarely close to the machine.

In addition, a multi-purpose tray which is generally used for feeding of an arbitrary size of sheet into the device instead of using the cassette unit is also attached to the side of the device. Generally, the multi-purpose tray for holding the recording sheets is provided as a flap door-like tray, which is opened and closed (or attached and detached) by the operator's hand. The flap-type tray is generally not rigid very much so that it cannot hold a large number of recording sheets. When the multi-purpose tray is opened, it projects from the side of the device. When this tray is closed, it forms a part of a lateral wall of the device. In short, there is no multi-purpose stacking area within the width of the conventional device. Accordingly, the amount of space by which the multi-purpose tray projects from the side of the device is necessary around the device. Furthermore, when inserting the recording sheets into the multi-purpose tray, an operation to open the multi-purpose tray (or an attachment operation) is necessary. Yet further, as a large amount of paper can not be stacked on this kind of multi-purpose tray projecting from the side of the device, there must be repeated supplementation of a small amount of paper to the multi-purpose tray.

Another type of image recording device having a plurality of trays is disclosed in Japanese Patent Application, Laid Open Publication No. 05-160939.

SUMMARY OF THE INVENTION

In order to solve the aforementioned problems, it is an object of the present invention to propose an image recording device provided with an image scanning part that transports a document and scans an image on the document and a recording part that transports a recording sheet and records an image on it, comprising in the order from the upper part of the device to the lower part of the device, a recorded paper discharge tray, a document sheet supply tray, a document sheet outlet tray, a multi-purpose tray and a recording sheet supply unit. The recording sheet supply unit supplies one page at a time from a large amount of stacked recording sheets.

The multi-purpose tray may be arranged horizontally in the space between the document sheet outlet tray and the recording sheet supply cassette unit.

The recording sheet supply unit includes a paper cassette for storing recording sheets and a cassette housing for the paper cassette. The paper cassette may be freely removed and inserted into the cassette housing. The recording sheet supply unit may also be removable from the image recording device. If the recording sheet supply unit is removed from the device, the multi-purpose tray defines the bottom of the image recording device.

Operations of the image recording device and removal of the paper cassette from the recording sheet supply part are both performed by a user while the user is facing at right angle to the document transport direction and recording sheet transport direction. Generally, the user stands in front of the image recording device to operate the an operation panel of the device, and the document and recording sheets are moved in a width direction of the device.

BRIEF DESCRIPTION OF THE ACCOMPANYING DRAWINGS

DETAILED DESCRIPTION OF THE PREFERRED EMBODIMENTS

Hereafter, an embodiment of the present invention will be described using the attached drawings. It should be noted that in each drawing, the side on which the operation panel 2 is mounted is the front and the side opposite that is the rear.

Figure 1:
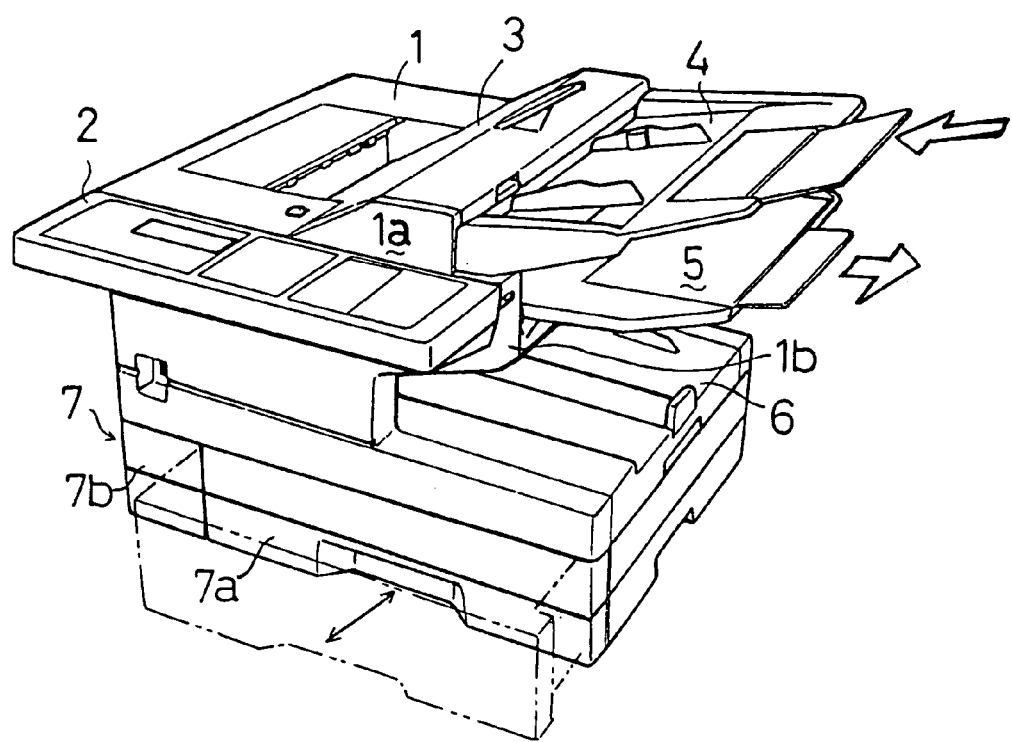
FIG. 1 is a perspective view of an image recording device of the present invention with a cassette unit in the mounted state.
Figure 2:
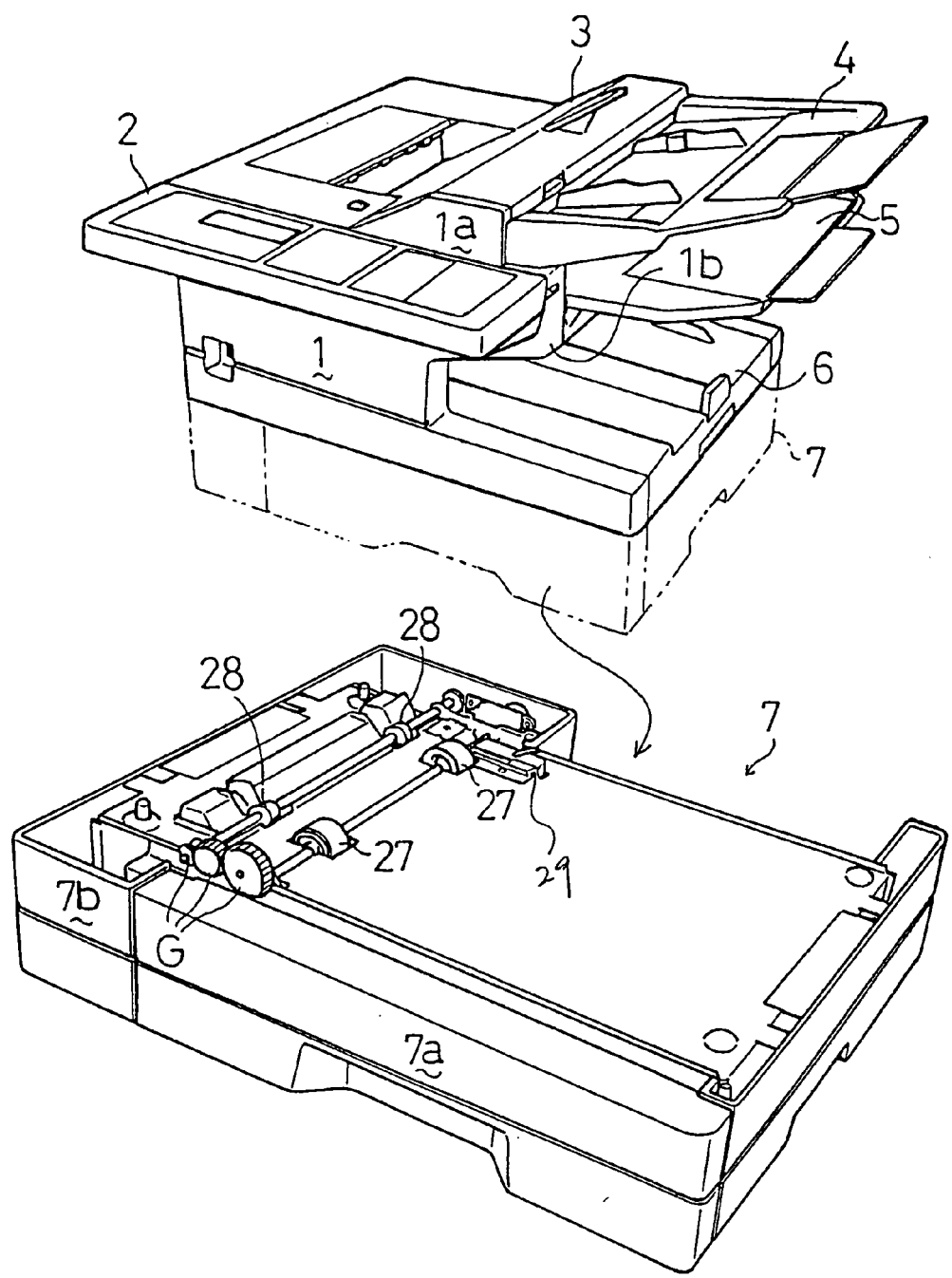
FIG. 2 is an exploded perspective view of the image recording device of the present invention with the cassette unit in the removed state.

Referring to FIG. 1, the image recording device of the present invention is equipped with both facsimile functions and copier functions. An operation panel 2 is provided on the front surface of a device main body 1 and the user performs copying and image data transmission operations by operating necessary keys on the operation panel 2. A recorded paper discharge tray 3, document sheet supply tray 4, document sheet outlet tray 5 and multi-purpose tray 6 which will be described later are positioned on the device main body 1. Furthermore, as best shown in FIG. 2, a cassette unit 7 is mounted on base 1c of the device main body 1. The cassette unit 7 is removable from the device main body 1. As illustrated in FIG. 1, the transport direction of the document and recording sheets coincides with the width direction of the device main body 1 as indicated by the unshaded arrows. In other words, a user manipulating the image recording device stands in front of the operation panel 2 and the document and recording sheets move transversely in front of the user. Each of the trays 3, 4 and 5 also extends in the width direction of the device and are substantially confined in the width of the device main body 1. Therefore, there is no interference of these trays with the operation panel 2 and user operating this. Since the trays 3, 4 and 5 do not project substantially from the side of the device main body 1, this device can save the space.

Figure 3:
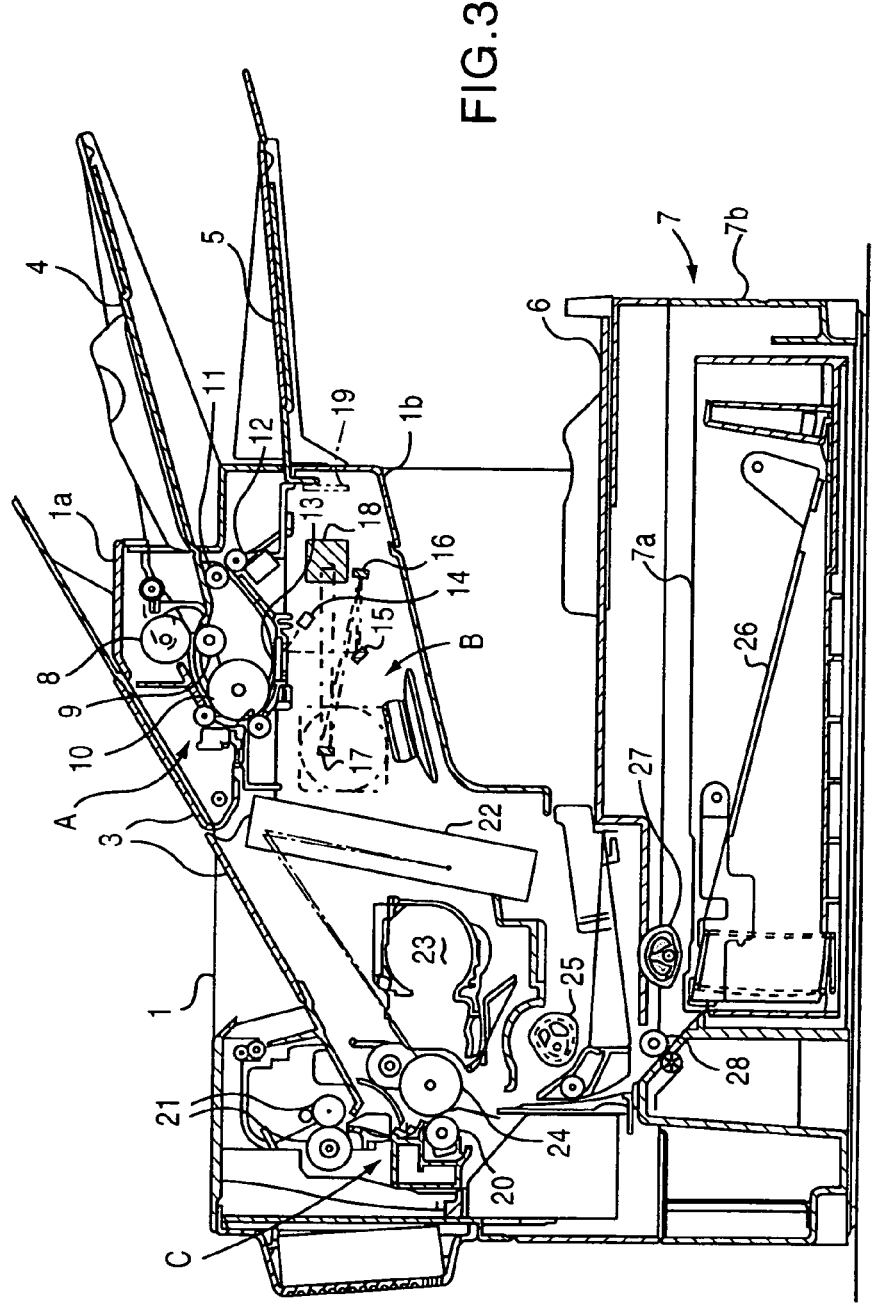
FIG. 3 is front sectional view of the image recording device of the present invention with the cassette unit in the mounted state.

Next, the positions of the trays 3, 4 and 5 will be described in detail. The recorded paper discharge tray 3 is arranged on the uppermost part of the device main body 1 such that it inclines leftward when viewed from the front (FIG. 3). As it is arranged on the uppermost part, confirmation can be quickly performed when a recorded paper has been ejected.

The recorded paper discharge tray 3 defines a part of the document transport unit cover 1a (FIG. 1). As illustrated in FIG. 3, an automatic document transport unit A forming a C or right-turned U-shaped document transport pathway is arranged in the cover 1a. On the right outer side of the document transport unit cover 1a, a document sheet supply opening is formed at the top and a document ejection opening is formed at the bottom. The document sheet supply tray 4 is mounted on the document sheet supply opening at an angle when viewed from the front. On the device main body 1, an image scanner cover 1b is located below the document transport unit cover 1a and the document sheet outlet tray 5 is mounted approximately horizontally on the right outer side part of the image scanner cover 1b. An image scanning part B comprising an optical image scanning device is situated inside the image scanner cover 1b below the automatic document transport unit A positioned inside the document transport unit cover 1a.

Figure 4:
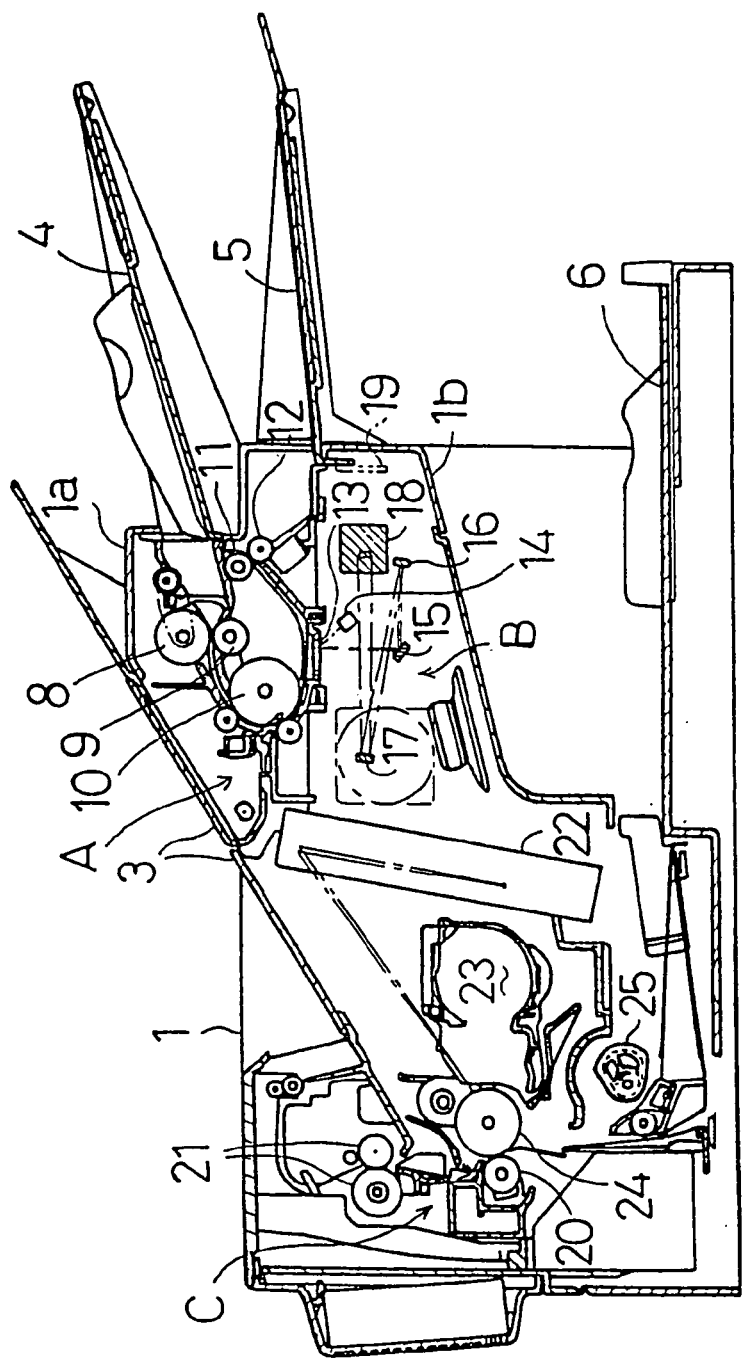
FIG. 4 is front sectional view of the image recording device of the present invention without the cassette unit.

The automatic document transport unit A and image scanning part B will be described with FIGS. 3 and 4. The automatic document sheet supply unit A has a separation roller 8 and retard roller 9 in the vicinity of the document sheet supply opening formed at the left end of the document sheet supply tray 4 and transports the uppermost sheet of the documents stacked in the document sheet supply tray 4. A transport roller 10 is positioned at the deepest position of in the C-shaped document transport path and makes the document transported from the document sheet supply opening perform a U-turn. A document scanning plate 13 arranged with a transparent plate is positioned horizontally downstream of the transport roller 10. A light source 14 that illuminates the plate 13 from below is also arranged. Furthermore, the scanned document is ejected to the document sheet outlet tray 5 by ejection rollers 11 and 12 arranged at the document ejection opening.

In the image scanning part B, a first mirror 15 is arranged below the document scanning plate 13, the light source 14 illuminates the document passing over the document scanning plate 13 and that image is reflected onto the first mirror 15. The light reflected from the first mirror 15 is reflected onto a second mirror 16 and then onto a third mirror 17 and then onto a lens 18. The image reflected in the lens 18 is converted to an electronic signal by a photo-electric converter (CCD) 19.

The base of the image scanner cover 1b is inclined leftwards gently when viewed from the front and the horizontal multi-purpose tray 6 is arranged below that. A sufficient space is maintained between the multi-purpose tray 6 and the base of the image scanner cover 1b thus a lot of sheets may be stacked at once on the multi-purpose tray 6 by using this space. This solves the problem of repetitively supplying paper. Furthermore, as a multi-purpose paper stacking space is maintained above the multi-purpose tray 6, there is no need for the image recording device to have an opening and closing arrangement (or removable structure) for the multi-purpose tray 6. When paper is to be fed by hand, this removes the necessity of opening and closing (attaching and removing) the tray each time. Yet further, as the base of the image scanning cover 1b is angled upwards to the right when viewed from the front with respect to the horizontal multi-purpose tray 6, the space between both increases towards the outer side (or toward the right) and this facilitates paper supply operations to the multi-purpose tray 6.

The multi-purpose tray 6 is formed on the upper surface 1d of the base 1c of the main body 1. As shown in FIGS. 1 and 3, the cassette unit 7 below the base 1c of the device main body 1 includes a paper cassette 7a for storing the recording sheets and a unit body or housing 7b for receiving the paper cassette 7a. Standard paper may be contained in large volume in the paper supply cassette 7a but in the case of the image recording device of the present invention, a large amount of paper may also be stacked in the multi-purpose tray 6 and furthermore opening/closing (attachment/removal) operations of the tray 6 are unnecessary. Therefore, the present invention is compatible with only using the multi-purpose tray 6 without the cassette unit 7.

Figure 5:
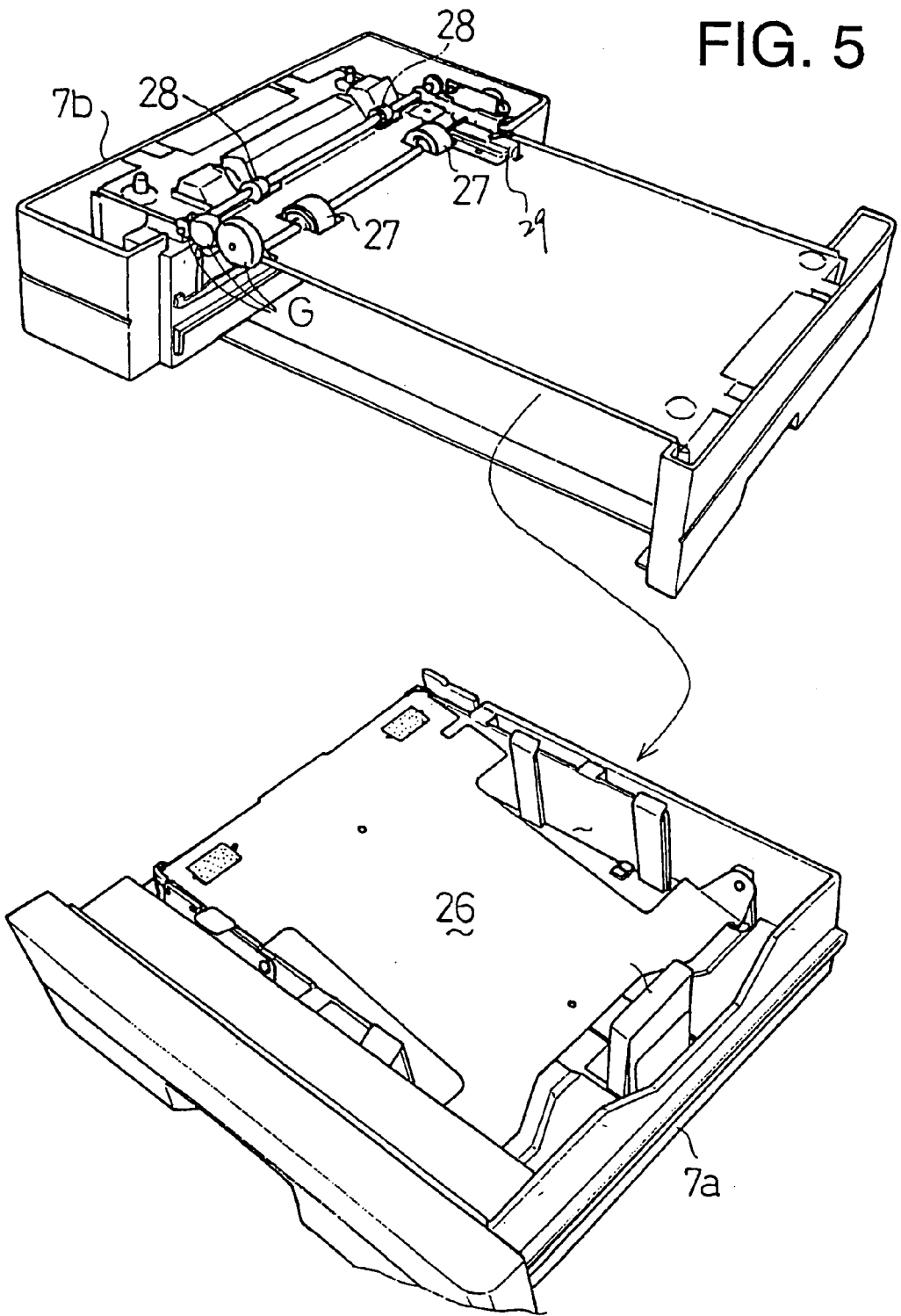
FIG. 5 is an exploded perspective view of the cassette unit with a paper cassette being removed from a cassette housing.

Hereafter, the arrangement of the cassette unit 7 will be described using FIGS. 2, 3 and 5. Referring first to FIG. 3, a push-up plate 26 is arranged in the paper cassette 7a. This plate 26 is biased from below by a spring at its one end (let end in FIG. 3 or the end on the paper outlet side) with the opposite end being a rotation pivot. A pair of pick-up rollers 27 and a pair of paper feed rollers 28 are supported in the cassette unit body 7b. The pick-up rollers 27 are arranged above the spring-supported end of the paper push-up plate 26 when containing the paper cassette 7a, and the paper feed rollers 28 are situated downstream in the paper transport direction. As best seen in FIG. 5, a gear system G is arranged between the pick-up rollers 27 and supply paper rollers 28 and that gear system G engages with another gear system of inside the device main body 1 when the cassette unit 7 is attached to the base 1c of the image recording device (main body 1) as shown in FIG. 1. A drive torque is transmitted from the device main body 1 to the supply paper rollers 28 and pick-up rollers 27.

Yet further, a stopping means (electromagnetic solenoid or the like: not shown) for the pick-up roller 27 and a supply paper direction means (sensor: not shown) are arranged in the cassette unit 7 as a supply paper control means for the recording sheet from the paper supply cassette 7a. Each of the pick-up rollers 27 is controlled so as to rotate 360 degrees and stop per one page of recording sheet. A power source connector 29 is provided for these stopping means and supply paper detection means. By mounting the cassette unit 7 on the lower surface of the base 1c of the image recording device as shown in FIG. 1, the power source connector 29 is made to automatically connect with a connector (not shown) attached to the device main body 1 of the image recording device.

When the cassette unit 7 is mounted on the base 1*c* of the image recording device, the paper supply cassette 7*a* is drawable/insertable from the front side of the device main body 1 as indicate by the phantom line and double arrow in FIG. 1, in short, from the same side as the operational panel 2. Accordingly, the user performing the operations of the image recording device at the operation panel 2 is able to perform removal operations of the paper supply cassette 7*a* without moving (or changing his or her position) when the recording sheets are to be supplemented to the cassette 7*a*.

As described above, the automatic document transport unit A and image scanning part B are arranged in the generally right half of the inside of the device main body 1 and a stacking space for multi-purpose paper is arranged by using the space below the image scanning part B. The recording part C is located in the left half of the device main body 1. As shown in FIGS. 3 and 4, a multi-purpose pick-up roller 25 is arranged in the paper supply opening continuous with the multi-purpose tray 6. A paper transport path from this paper supply opening and another paper transport path from the cassette unit 7 merge with each other near the roller 25 and a combined paper transport path extends upward until the paper ejection opening. This paper ejection opening is continuous with the recorded paper discharge tray 3. A transfer roller 20 and fixer unit 21 care spacedly arranged along the paper transport path. An almost upright laser unit 22 is also arranged between the image scanning part B and recording part C above the cassette unit 7.

A removable or replaceable toner cartridge 23 and sensitizing drum 24 are arranged next to each other between the laser unit 22 and transfer roller 20. The sensitizing drum 24 is positioned such that it is in contact with the transfer roller 20 and the paper passes between the transfer roller 20 and sensitizing drum 24. The toner cartridge 23 is positioned such that a toner is attached to the surface of the sensitizing drum 24.

Based on an electronic signal derived from the document image obtained at the photoelectric converter 19 or a facsimile signal received from a remote facsimile machine, a laser beam is illuminated onto the surface of the sensitizing drum 24 from the laser unit 22, a static latent image (charge) is formed on the surface of the sensitizing drum 24 and the toner is forced to adhere onto this static latent image. When paper passes between the sensitizing drum 24 and transfer roller 20, the toner attached to the sensitizing drum 24 is attached to the paper. The paper is further transported and it is heated by the fixer 21 thereby fixing the attached toner to the paper. Thus recording is performed on the paper and the recorded paper is ejected to the recorded paper discharge tray 3.

As understood from the above, the image recording device of the present invention demonstrates the followings advantages.

Firstly, the recorded paper discharge tray is positioned in the uppermost part of the image recording device. Accordingly, when there is a facsimile data reception and the recorded paper (paper on which is recorded the received facsimile data) is ejected in this tray, this is soon and easily recognized by the user.

Furthermore, an arrangement where the trays do not project from the lateral sides of the device can be maintained whereby a space required for the image recording device is reduced.

Yet further, the multi-purpose tray does not project from the lateral sides of the device, either. Consequently, there is no necessity to secure a space for the multi-purpose tray 6 on the lateral side of the device. This also contributes to space saving. In addition, there is no need to open/close or attach/remove the multi-purpose tray by hand since the multi-purpose tray 6 is a built-in tray. Together with the horizontal positioning of the multi-purpose tray, a relatively large paper stacking space is maintained in the multi-purpose tray 6. The built-in multi-purpose tray is more rigid than a conventional flap-type tray. Accordingly, a larger amount of recording sheets can be placed on the multi-purpose tray 6 than a conventional flap-type tray. The multi-purpose tray is also open to the user standing in front of the operation panel 2 so that an operation for supplying the recording sheets to the multi-purpose tray 6 is easy. The space for a user's hand when inserting the recording sheets into the tray is maintained so that operability is improved.

The recording paper supply part of the illustrated embodiment is the freely attachable/removable cassette unit 7. When the amount of paper usage is not great, the image recording device may not have the cassette unit 7. In this case, the multi-purpose tray 6 may be used instead of the paper cassette unit 7 since this tray can store a considerable number of recording sheets. Thus, the costs associated with the cassette unit 7 may be dispensed with.

The ejected recorded paper does not hinder the operations of document insertion or ejection even if the recorded document discharge tray is positioned at the uppermost part because the user can manipulate the device and supply the recording sheets to the multi-purpose tray from the front side of the device.

The paper supply cassette 7*a* can be removed from the recording sheet supply part while the user is facing in the same direction as he is operating the image recording device. Therefore, the paper may be supplied to the paper supply cassette 7*a* whilst operating the image recording device, and when a paper jam or a similar trouble occurs, the paper supply cassette 7*a* may be removed while still facing in the same direction and without moving to a different side of the device. This improves the operability of the device.

What is claimed is:

1. An image recording device having a top, a bottom and a width, comprising:
    a main body including:
    a recorded paper discharge tray provided at the top of the image recording device;
    a document sheet supply tray provided below the recorded paper discharge tray for holding a document sheet;
    a document sheet outlet tray provided below the document sheet supply tray for receiving the document sheet;
    a base having an upper surface; and
    a multi-purpose tray formed on said upper surface of said base and below the document sheet outlet tray for holding recording sheets, wherein a user loads said recording sheets directly onto said multi-purpose tray;
    a recording sheet supply part provided below said main body and independent of said multi-purpose tray for holding a plurality of stacked recording sheets and supplying a recording sheet one page at a time, said recording sheet supply part includes a paper cassette which is attachable to and detachable from said image recording device, said paper cassette capable of being manually loaded;
    an image scanner that transports the document sheet from the document sheet supply tray, scans an image on the document sheet and discharges the document sheet onto the document sheet outlet tray; and
    a recording part that transports the recording sheet from the recording sheet supply part or the multi-purpose tray, records an image on the recording sheet and discharges the recording sheet onto the recorded paper discharge tray, with the recorded paper discharge tray, the document sheet supply tray, the documents sheet outlet tray and the multi-purpose tray being confined within the width of the image recording device.

2. The image recording device as in claim 1, wherein the multi-purpose tray is arranged horizontally between the document sheet outlet tray and recording sheet supply part such that a considerable space is maintained between the multi-purpose tray and document sheet outlet tray.

3. The image recording device as in claim 1 or 2, wherein the recording sheet supply part comprises a cassette unit, the cassette unit includes a paper cassette and its housing, the paper cassette stores the recording sheets in a stacked state and is freely inserted in and removed from the housing, and the cassette unit is freely attached to and removed from the image recording device.

4. The image recording device as in claim 1 or 2, wherein operations of the image recording device and paper cassette insertion/removal actions are performed by a user facing at right angle to a document transport direction and a recording sheet transport direction.

5. The image recording device as in claim 3, wherein operations of the image recording device and paper cassette insertion/removal actions are performed by a user facing at right angle to a document transport direction and a recording sheet transport direction.

6. An image recording device having a top, a bottom and a width, comprising:
 a main body including:
  a recorded paper discharge tray provided at the top of the image recording device;
  a document sheet supply tray provided below the recorded paper discharge for holding a document sheet;
  a document sheet outlet tray provided below the document sheet supply tray for receiving the document sheet;
  a base having an upper surface; and
  a multi-purpose tray formed on said upper surface of said base and below the document sheet outlet tray for holding at least one recording sheet and supplying a recording sheet one page at a time;
 an image scanner that transports the document sheet from the document sheet supply tray, scans an image on the document sheet and discharges the document sheet onto the document sheet outlet tray; and
 a recording part that transports the recording sheet form the multi-purpose tray, recording an image on the recording sheet and discharges the recording paper discharge tray, the document sheet supply tray, the document sheet outlet tray and the multi-purpose tray being confined within the width of the image recording device.

7. The image recording device as in claim 6, wherein the multi-purpose tray is arranged horizontally between the document sheet outlet tray and recording sheet supply part such that a considerable space is maintained between the multi-purpose tray and document sheet outlet tray.

8. The image recording device as in claim 6 or 7, wherein the recording sheet supply part comprises a cassette unit, the cassette unit includes a paper cassette and its housing, the paper cassette stores the recording sheets in a stacked state and is freely inserted in and removed from the housing, and the cassette unit is freely attached to and removed from the image recording device.

9. The image recording device as in claim 6 or 7, wherein operations of the image recording device and paper cassette insertion/removal actions are performed by a user facing at right angle to a document transport direction and a recording sheet transport direction.

10. The image recording device as in claim 8, wherein operations of the image recording device and paper cassette insertion/removal actions are performed by a user facing at right angle to a document transport direction and a recording sheet transport direction.

11. The image recording device as in claim 6 further including a recording sheet supply part provided at the bottom of the image recording device and below the multi-purpose tray for holding a plurality of stacked recording sheets and supplying a recording sheet one page at a time.

12. The image recording device as in claim 6, wherein the multi-purpose tray defines the bottom of the image recording device.

13. The image recording device as in claim 6, wherein the user can insert the recording sheet into the multi-purpose tray from a direction perpendicular to the width of the device.

* * * * *